United States Patent
Shigeta

(10) Patent No.: US 12,481,855 B2
(45) Date of Patent: Nov. 25, 2025

(54) MANAGEMENT SYSTEM FOR GAME TOKEN COIN

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 18/511,202

(22) Filed: Nov. 16, 2023

(65) Prior Publication Data

US 2024/0086672 A1     Mar. 14, 2024

Related U.S. Application Data

(63) Continuation of application No. 17/840,325, filed on Jun. 14, 2022, now Pat. No. 11,861,436, which is a
(Continued)

(30) Foreign Application Priority Data

Jan. 31, 2019    (JP) ................................. 2019-028885

(51) Int. Cl.
    *G06K 19/07*       (2006.01)
    *G06K 19/04*       (2006.01)
(Continued)

(52) U.S. Cl.
    CPC ....... *G06K 19/0712* (2013.01); *G06K 19/047* (2013.01); *G06K 19/07318* (2013.01); *G07F 17/3251* (2013.01)

(58) Field of Classification Search
    CPC ............. G06K 19/0712; G06K 19/047; G06K 19/07318; G07F 17/3251
(Continued)

(56) References Cited

U.S. PATENT DOCUMENTS 5,735,742 A    4/1998   French
7,597,250 B2 *   10/2009   Finn .................... G06K 7/10237
                                                               235/487
(Continued)

FOREIGN PATENT DOCUMENTS

CN        101283382 A     10/2008
JP        2009018021 A     1/2009
(Continued)

OTHER PUBLICATIONS

European Search Report dated Jun. 3, 2020 issued in corresponding/family EP application 20154486.3.
(Continued)

*Primary Examiner* — Michael G Lee
*Assistant Examiner* — David Tardif
(74) *Attorney, Agent, or Firm* — NORTON ROSE FULBRIGHT US LLP

(57) ABSTRACT

In a management system of a game token coin, one RFID tag having a data non-rewritable region and a data rewritable region is imparted to the game token coin. The location relating information of the game token coin is stored in the data rewritable region. The system includes a writer configured to additionally write the location relating information, a reader configured to read the location relating information from a plurality of the game token coins, and a management controller configure to examine the information obtained from the reader. The management controller includes a function that determines whether a history of the location relating information obtained from the reader has no abnormality.

10 Claims, 14 Drawing Sheets

Related U.S. Application Data continuation of application No. 17/076,255, filed on Oct. 21, 2020, now Pat. No. 11,392,812, which is a continuation of application No. 16/774,428, filed on Jan. 28, 2020, now Pat. No. 10,885,416.

(51) Int. Cl.
*G06K 19/073* (2006.01)
*G07F 17/32* (2006.01)

(58) Field of Classification Search
USPC ............................................. 235/492
See application file for complete search history.

(56) References Cited

U.S. PATENT DOCUMENTS

| | | | |
|---|---|---|---|
| 2005/0116049 A1* | 6/2005 | Kobayashi | G06F 21/86 235/492 |
| 2006/0094498 A1 | 5/2006 | Jorasch et al. | |
| 2007/0060311 A1 | 3/2007 | Rowe et al. | |
| 2008/0224823 A1* | 9/2008 | Lawson | G06F 21/34 340/5.8 |
| 2009/0149247 A1 | 6/2009 | Esbensen et al. | |
| 2009/0283589 A1* | 11/2009 | Moore | H04L 9/3234 235/382 |
| 2010/0093428 A1* | 4/2010 | Mattice | G07F 17/3239 463/25 |
| 2010/0105486 A1 | 4/2010 | Shigeta | |
| 2010/0160032 A1* | 6/2010 | Paton | G07F 19/20 463/25 |
| 2014/0335945 A1* | 11/2014 | Okada | G07F 17/3202 463/25 |
| 2018/0336757 A1* | 11/2018 | Shigeta | G06K 19/047 |
| 2020/0265672 A1* | 8/2020 | Shigeta | G07F 17/3234 |

FOREIGN PATENT DOCUMENTS

| | | |
|---|---|---|
| WO | 1999025439 | 5/1999 |
| WO | 2008120749 A1 | 10/2008 |
| WO | 2018066111 A1 | 4/2018 |

OTHER PUBLICATIONS

Chinese Office Action dated Jan. 5, 2023 issued in CN application 202210036548.6.

Japanese Office Action dated Jan. 23, 2024 issued in JP application No. 2020-007499.

"UHF RFID Extended Memory Tag Application" by Takehiro Ito, published in Mitsubishi Denki Technical Report, vol. 84, No. 8, pp. 47-50, on Aug. 25, 2010 (Submitting with English translation of Abstract).

Korean Office Action dated Jan. 16, 2025 issued in KR Application No. 10-2020-0010962.

* cited by examiner

| ID NUMBER | CASINO NAME | TYPE | VALUE | HISTORY OF LOCATION INFORMATION |
|---|---|---|---|---|
| ⋮ | ⋮ | ⋮ | ⋮ | ⋮ |
| apxx7216-3319 | ABC Casino | VIP ROLLING CHIP | $500 | ○→○→⋯→○→○ |
| apxx7216-3320 | ABC Casino | VIP ROLLING CHIP | $1,000 | ○→○→⋯→○→○ |
| apxx7216-3321 | ABC Casino | VIP ROLLING CHIP | $1,000 | ○→○→⋯→○→○ |
| ⋮ | ⋮ | ⋮ | ⋮ | ⋮ |

FIG.6

MANAGEMENT SYSTEM FOR GAME TOKEN COIN

CROSS REFERENCE TO RELATED APPLICATION

The present application is a continuation of U.S. patent application Ser. No. 17/840,325 filed Jun. 14, 2022, which is a continuation of U.S. patent application Ser. No. 17/076,255 filed Oct. 21, 2020 (now U.S. Pat. No. 11,392,812), which is a continuation of U.S. patent application Ser. No. 16/774,428, filed Jan. 28, 2020 (now U.S. Pat. No. 10,885,416), which claims priority to JP Pat. App. No. 2019-028885 filed Jan. 31, 2019; the entire contents of each disclosure are hereby incorporated by reference.

FIELD

The present disclosure relates to a management system for a game token coin that avoids the use of fraud game token coins in a gaming house, such as casinos and other game facilities where game token coins are used.

BACKGROUND AND SUMMARY

In many table games played in gaming houses, such as casinos, there are baccara and blackjack. In the casinos, game token coins are used for such games.

The use of fraud game token coins must not happen in casinos. In order to avoid the use of fake game token coins in the casino, there is a technique in the casino that determines whether a game token coin is a fake or not with an RFID tag attached to the game token coin and avoids the use of fakes. RFID-attached game token coins are publicly known, and an RFID-attached game token coin is disclosed in WO 2008/120749. It is generally known that the RFID tag has a memory region in which the manufacture unique information of the RFID tag itself and a memory region in which a user can write necessary information. In the RFID-attached game token coin, information indicating the value of the game token coin, a serial number, and any other information are written.

Conventionally in the RFID-attached game token coin, the operation is performed in which after necessary information is written in a memory region, in which the user can write information, the memory region is locked, and unauthorized rewrite is avoided. In the game token coin based on such a previously existing technique, it is possible to determine whether the game token coin itself is fake or not by reading RFID to specify the information written in the memory region. However, RFID fails to store information obtained on casino sites during use. Therefore, reading RFID fails to determine the presence of game token coins having unusual history on the point of use situations, such as game token coins that are genuine but are not used for a longtime and game token coins that are used or exchanged by an owner who is different from its right owner, and the avoidance of the use of such game token coins having unusual use history in the casino fails. There is a concern that taking advantage of such game token coins having unknown history (the history of location relating information), game token coins in the casino may be used for crimes, including money-laundering, for example, and the solution to the concern is asked for.

Therefore, an object of the present disclosure is to provide a game token coin and a management system that enable additional write of information on an RFID tag, allow the RFID tag of the game token coin to retain the use history of the game token coin, and enable the finding of a fraud game token coin having unusual use history based on the written use history.

In order to solve the previously existing problem, in a management system for a game token coin according to the present disclosure, one RFID tag having a data non-rewritable region and a data rewritable region is imparted to a game token coin, the data non-rewritable region of the RFID tag is configured to store, as constant information, at least one of production information, product information, casino information, value information, and a serial number of the game token coin, and the data rewritable region is configured to store, as variable information, location relating information (or formation about the whereabouts) of the game token coin, in which from the constant information (or fixed information) stored in the data non-rewritable region of an RFID tag, the variable information stored in the data rewritable region of the same RFID tag is extractable. The system further includes a writer configured to additionally write the location relating information of the game token coin in the data rewritable region, a reader configured to collectively read the constant information stored in the data non-rewritable region of a plurality of the game token coins and to read the location relating information stored in the data rewritable region that is paired with each of the constant information based on the read constant information, and a management controller configured to examine the location relating information obtained from the reader. The data rewritable region stores information relating to a plurality of locations including at least latest location relating information of all sets of the location relating information written by the writer, and the management controller includes a function that determines whether a history of the location relating information obtained from the reader has no abnormality, in which the management controller is configured to generate an error signal when an abnormality is found, and the management controller is configured to identify the constant information of a game token coin that is determined that an abnormality is found.

The data rewritable region is configured to store the location relating information and information on time at which the writer makes a write on the game token coin, and the management controller is configured to determine, from the location relating information obtained from the reader, as determination whether the abnormality or not, whether there is any event that the game token coin is not used for a predetermined period or more from a previous write, or that the location relating information which has to be written is not written.

In the management controller, the location relating information may include at least one of information indicating a cage, information indicating entering or leaving, and information indicating a backyard, and the event that the game token coin is not used for a predetermined period or more from a previous write is any situation in which 1) latest location relating information is information indicating a cage, and a subsequent information write is made after an elapse of a predetermined time or more, 2) latest location relating information is information indicating entering, and a subsequent information write is made after an elapse of a predetermined time or more, and 3) latest location relating information is information indicating leaving, and a subsequent information write is made after an elapse of a predetermined time or more. The event that the location relating information that has to be written is not written is any situation in which 4) when a player enters gaming house, as latest location relating information of the data rewritable region of the game token coin, information indicating leaving is not written, 5) when a game token coin is used at a cage, information indicating a backyard is not written, and 6) when a player leaves gaming house, information indicating a cage or a backyard is not written.

The location relating information may include information relating to an owner who owns the game token coin.

The management controller may include a function that determines any situation 1) or 2) as the event that is determined whether an abnormality or not based on the owner relating information obtained from the reader in which 1) a person who is different from a final owner stored in the data rewritable region converts the game token coin into money or makes exchange of game token coins in a gaming house, or leaves gaming house, and 2) a person different from an owner in leaving stored in the data rewritable region brings in the game token coin in the gaming house.

The information relating to an owner who owns the game token coin may be identified by face recognition or reading an ID card.

The location relating information may further include information indicating a place of a chip tray of a specific game table, or information indicating a place of a bet area, or information indicating a payment area.

The management controller may include a function that determines any of situations 1) to 4) as the event that is determined whether an abnormality or not based on information indicating the place of the chip tray of the game table, or information indicating the place of the bet area or a payment area obtained from the reader in which 1) a person who is different from a final owner stored in the data rewritable region uses the game token coin at a game table, 2) a person who is different from a person who purchases a game token coin at a cage converts the game token coin into money at the cage, and the game token coin does not have use record at a game table, 3) a game token coin having no information indicating a cage or a backyard is used in a gaming house, and 4) latest location relating information is information indicating a bet area or a payment area, and a game token coin is converted into money at the cage or used at game table after a lapse of a predetermined period or more.

Information that the RFID tag has may be encrypted.

The data non-rewritable region may be configured to functionally write no data or is locked so as to allow no data write.

The reader may be configured to collectively read the constant information stored in the data non-rewritable region and location relating information stored in the data rewritable region of an RFID tag, and the management controller may be configured to extract the location relating information stored in the data rewritable region of the same RFID tag from a plurality of sets of the constant information of a plurality of the game token coins read by the reader and determine the location relating information.

In order to solve the previously existing problem, a game token coin according to the present disclosure includes one RFID tag having a data non-rewritable region and a data rewritable region. The data non-rewritable region is configured to store, as constant information, at least one of production information, product information, casino information, value information, and a serial number of the game token coin. The data rewritable region is configured to store, as variable information, location relating information of the game token coin written by a writer. The variable information stored in the data rewritable region of the RFID tag is extractable from the constant information stored in the data non-rewritable region of the same RFID tag.

The game token coin may be configured in which a reader collectively reads the constant information stored in the data non-rewritable region of a plurality of the game token coins, and the location relating information stored in the data rewritable region is read based on the read constant information.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is a diagram showing a database according to another embodiment of the present disclosure.

DETAILED DESCRIPTION OF EMBODIMENTS

Figure 1:
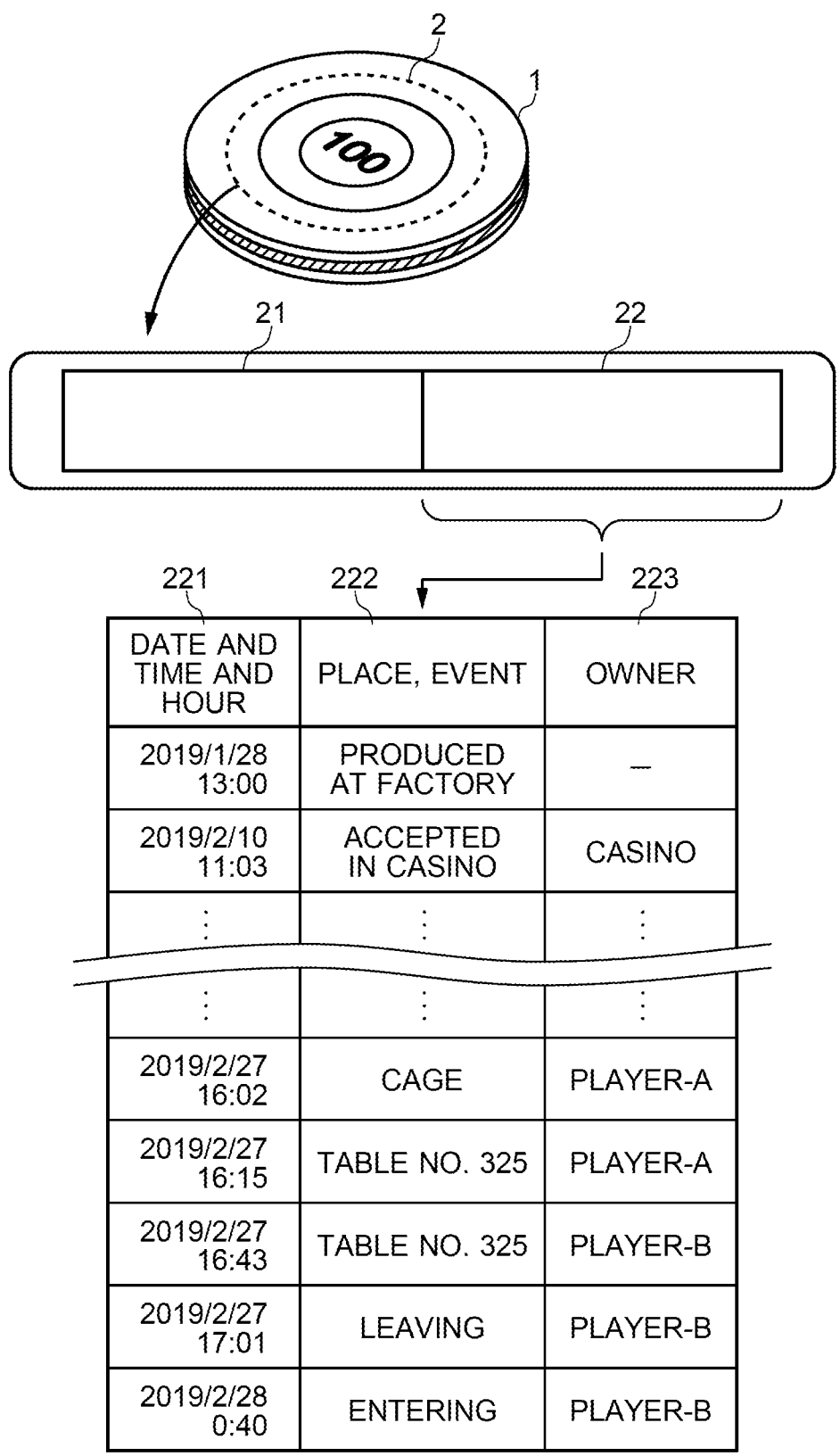
FIG. 1 is an illustrative diagram of an RFID tag of a game token coin according to an embodiment of the present disclosure.

First, a game token coin that is used in a management system for a game token coin according to an embodiment of the present disclosure will be described. FIG. 1 shows a game token coin 1 that is used in the management system. In FIG. 1, in the game token coin 1, an RFID tag 2, on which various items of information can be stored, is embedded. The RFID tag 2 includes a data non-rewritable region 21 and a data rewritable region 22.

In the data non-rewritable region 21, as constant information (or fixed information) 3, information that is not changed during the use of the game token coin 1, or information that cannot be not changed, or information that does not have to be changed is stored. More specifically, as the constant information 3, production information, product information, casino information, value information, serial numbers, and any other information of the game token coin 1 are stored. The production information includes a date and time when the game token coin is produced, a production machine, and the like. The product information includes information indicating a chip for the VIP area of a casino, for example, information that indicating a type of chip (e.g., information indicating that the game token coin 1 is a rolling chip or a cash chip), and any other information.

The data non-rewritable region 21 may be a region in which no data write is functionally allowed due to the specifications of the RFID tag, or may be a region in which necessary information is written in the region in which a write is allowed and then the region is locked such that no data write is allowed.

The data rewritable region 22 stores information, as variable information 4, that changes during the use of the game token coin 1. For example, as shown in FIG. 1, as the variable information 4, location relating information 220 is stored, including information 221 relating to a date and time, information 222 relating to a place and an event, information 223 relating to an owner, and any other information.

The constant information 3 and the variable information 4 may be encrypted in order to avoid unauthorized information read or write by an unauthorized person. The constant information 3 and the variable information 4 may be stored as metadata.

Figure 2:
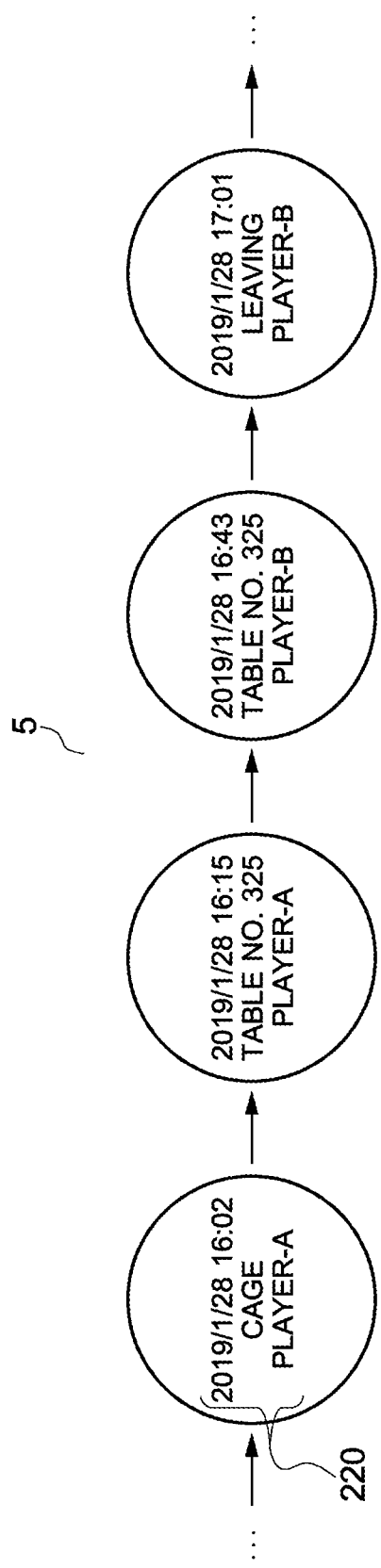
FIG. 2 is a conceptual diagram showing a recording method for data of the game token coin according to an embodiment of the present disclosure.

FIG. 2 shows an example recording method for data of the variable information 4 of the game token coin 1. As shown in FIG. 2, a configuration is provided in which the location relating information 220 compose of the date-and-time information 221, the place-and-event information 222, and the owner information 223 is formed in one block, the block information is connected in a chain, and thus the history of the location relating information 220 of the game token coin 1 can be determined.

FIG. 2 shows an example of the variable information 4 stored on the game token coin 1, from which the movement of the game token coin 1 can be determined as follows. At 16:02 on Jan. 28, 2019, Player-A exchanges cash for the game token coin 1 at a cage 5. At 16:15 on January 28, Player-A makes a bet at table No. 325 using the game token coin 1. At 16:43 on January 28, Player-B receives the game token coin 1 as redemption money for winning a bet at table No. 325. At 17:01 on January 28, Player-B leaving the casino with the game token coin 1.

The variable information 4 may be configured in which the latest information alone is stored as shown in FIG. 2, or may be configured in which all sets of the location relating information written in the past is stored. In a plurality of sets of the location relating information, some sets of the location relation information may be selected and stored. In the case in which some sets of the location relating information are selected and stored, the selected sets of the location relating information may include at least the latest location relating information 220 among the all sets of the location relating information 220. With the configuration above, from the variable information 4 of a game token coin 1, the history of use or transfer of the game token coin 1 can be known. That is, a kind of traceability information of the game token coin 1 is written on the game token coin 1 itself, and the game token coin 1 has a configuration in which its history is detectable.

Figure 3:
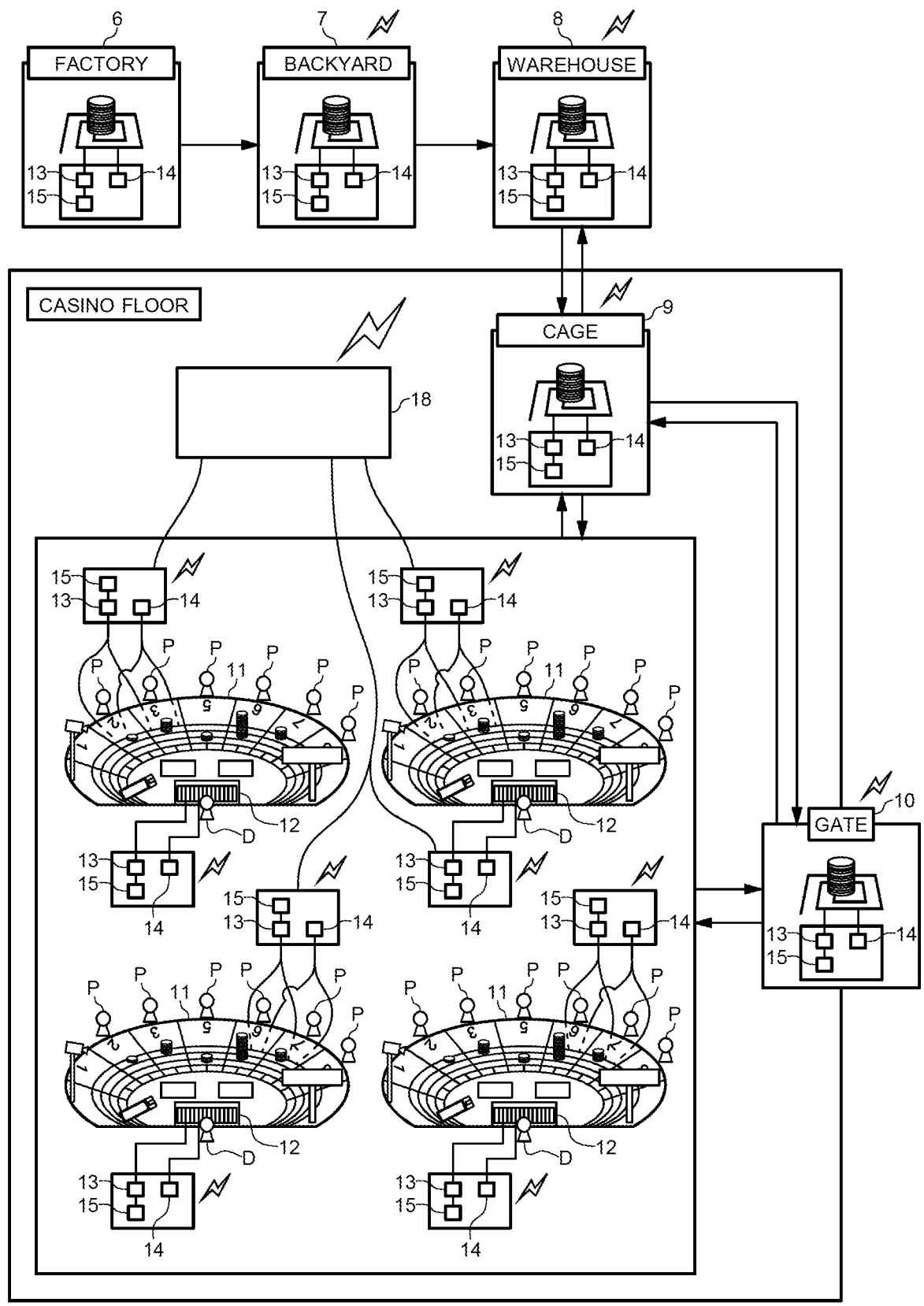
FIG. 3 is a diagram showing the outline of an overall management system for a game token coin according to an embodiment of the present disclosure.

Next, a management system of the game token coin 1 according to the present embodiment will be described. FIG. 3 shows the outline of the overall management system.

First, at a factory 6, for the game token coin 1, a writer 14 writes the variable information 4 including information about the completion of production or the factory shipment to the data rewritable region 22 of the RFID tag 2 as the location relating information 220.

At a backyard 7 of the casino an acceptance process of the game token coin 1 shipped from the factory 6 is performed. At the backyard 7, a reader 13 reads the variable information 4 stored in the data rewritable region 22 of the game token coin 1, and a management controller 15 determines whether the location relating information 220 indicating that information is written at the factory 6 as information that has to be written is written as the latest variable information 4 based on a read result. Supposing that when no write record is available at the factory 6, an error signal is generated as a game token coin that is suspected as a fraud game token coin. Thus, the casino side rejects the acceptance of that game token coin, or asks the factory side to make investigation. When the write record has no problem, the writer 14 writes the location relating information 220 indicating that the backyard in the data rewritable region 22 of the RFID tag 2. In writing, location information indicating the backyard may be described in addition to location information indicating the factory, or location information indicating the backyard may be described with location information indicating the factory deleted. The read and write of the game token coin at the backyard 7 described above may be performed in combination with the general validation work or activation work of the game token coin.

The game token coin 1 on which acceptance tests are completed at the backyard 7 is carried to a warehouse 8 or a cage 9 of the casino. In the warehouse 8 or the cage 9, the reader 13 reads the variable information 4 stored in the data rewritable region 22 of the game token coin 1, and the management controller 15 determines whether the location relating information 220 indicating that information is written at the backyard 7 as information that has to be written is written as the latest variable information 4 based on a read result. Tests may be performed together with determination whether information that indicates the factory 6 is written in the history of the variable information 4. Similarly to the tests at the backyard 7 as described above, the management controller 15 determines whether the history of the location information has no abnormality. When the read result has no problem, the writer 14 writes the location relating information 220 indicating the warehouse 8 or the cage 9 in the data rewritable region 22.

A player exchanges cash for the game token coin 1 at the cage 9. When the player purchases a game token coin 1, the writer 14 at the cage 9 writes information indicating time at which the game token coin is purchased and information indicating that the owner of the game token coin is changed from the casino to a customer as the variable information 4. A configuration may be provided in which the player is identified and recorded by a face recognition technique, or an ID card, such as a member's card of the casino, or an Individual Number Card.

The player makes a bet by placing the game token coin 1 on a bet area 11 of a game table using the purchased game token coin 1. The reader 13 reads the location relating information 220 composed of the date-and-time information 221, the place-and-event information 222, and the owner information 223 from the RFID tag 2 of the bet game token coin 1, and the management controller 15 determines whether the location relating information 220 has no abnormality. For example, the management controller 15 can determine an abnormality in the case in which a certain period has elapsed from use information on the game table or from the date and time on conversion information at the cage, which are lastly written, or in the case in which the owner information 223 stored on the game token coin 1 is different from the owner information 223 identified by face recognition or an ID card.

In the case in which the read result has no problem, the writer 14 additionally writes the location relating information 220 in the data rewritable region 22 of the bet game token coin 1. The location relating information 220 includes the date-and-time information 221, the place-and-event information 222, and the owner information 223. At the table, the writer 14 writes the variable information 4 including information on a player position number of the game token coin 1 placed and a player, for example. The information on the player may be identified by an ID card or face recognition. Generally, since a plurality of game token coins 1 is stacked and placed in the bet area 11, the game token coins 1 are collectively written in the stacked state.

When the player brings out the game token coin 1 from the casino floor, a leaving process is performed at a gate 10. In leaving, the reader 13 reads the location relating information 220, and the management controller 15 determines whether the variable information 4 has no abnormality. At the gate 10, the writer 14 writes the variable information 4 including the place-and-event information 222 indicating leaving and the owner information 223.

When a player enters the casino floor, in the case in which the player brings in a game token coin 1 having been brought out from the casino floor, the reader 13 reads the location relating information 220, and the management controller 15 determines whether the variable information 4 has no abnormality. For example, for the game token coin 1 that has been once brought out from the casino, in the case in which the owner when leaving the casino is different from the owner when entering the casino, it can be determined that there has been the act of transfer the game token coin outside the casino.

In the case in which the determination based on the read result by the reader 13 is abnormal, the management controller 15 described above may output an alarm to the cage 9 or the gate 10. When the owner of the game token coin 1 converts the game token coin 1 into money at the cage 9 or the game token coin 1 leaves the gate 10, the conversion of the game token coin 1 into money can be refused or the owner can be checked separately, based on the alarm outputted from the management controller 15. In the case in which the determined result is abnormal, the management controller 15 may determine a response, such as sending a warning to dealers at the game tables to interrupt games, sending a warning to a pit where a manager determines whether to interrupt or continue games, for example, or the game token coin 1 is exchanged. Alternatively, a configuration may be provided in which the management controller 15 is connected to a total management controller 18 of the casino and the management controller 15 sends a warning to the total management controller 18.

Similarly, when the game token coin 1 is converted into money at the cage, the reader 13 may read the variable information 4, and the management controller 15 may determine an abnormality. More specifically, the management controller 15 may determine an abnormality, in the case in which a certain period has elapsed from use information on the game table or from the date and time on conversion information at the cage, which are lastly written, or in the case in which a person who is different from the owner information 223 stored on the game token coin 1 is to convert the game token coin 1 into money, for example. In the case in which an abnormality is determined, the management controller 15 may output a warning and refuse the conversion of the game token coin 1 whose abnormality is determined into money.

In the description above, an non-limiting example embodiment is described in which the reader 13 reads information, the management controller 15 makes determination, and then the writer 14 writes information. However, a configuration may be provided in which information is simultaneously read and written.

In the following, the detail of an embodiment to which the present disclosure is applied.

At the factory 6, in the completion of production or in shipment, the RFID tag 2 is read, written, or read and written. The production information or product information is written as the constant information 3, the RFID tag 2 is locked as necessary so as not to be rewritten, and the variable information 4 is written.

At the backyard 7, the game token coin 1 shipped from the factory 6 is accepted, and the RFID tag 2 is read, written, or read and written when the game token coin 1 is activated as a usable game token coin 1.

At the warehouse 8, the RFID tag 2 is read, written, or read and written when the game token coin 1 is transferred from the warehouse 8 to the cage 9 or the game token coin 1 is transferred from the cage 9 to the warehouse 8. Alternatively, to the game token coin 1 kept in custody at the warehouse 8, the RFID tag 2 is read, written, or read and written at certain time intervals, or a predetermined timing.

At the cage 9, the RFID tag 2 is read, written, or read and written in the transfer from or to the warehouse 8 and in the conversion of the game token coin 1 into money. In the case in which the game token coin 1 is converted into money at the cage 9, the place-and-event information 222 indicating conversion into money and information on a player who converts the game token coin 1 into money is written on the variable information 4 as the owner information 223. The owner information 223 can be acquired from the casino ID card of the player, a face recognition the system, a credit card, and any other device.

At the gate 10, the RFID tag 2 is read, written, or read and written, when the player leaves the casino. To all the game token coins 1 brought out from the casino when the player leaves the casino, the place-and-event information 222 indicating the game token coins 1 being brought out and the owner information 223 indicating the player who brings out the game token coins 1 are written as the variable information 4 for registration. Also when the player enters the casino, the place-and-event information 222 indicating the game token coins 1 being brought in and the owner information 223 indicating the player who brings in the game token coins 1 are similarly written as the variable information 4, and the game token coins 1 are registered.

In the bet area 11, the RFID tag 2 of the game token coin 1 placed in the bet area 11 by the player who joins betting is read, written, or read and written. The RFID tag 2 of the game token coin 2 placed by the dealer in the bet area 11 as redemption money for the player is read, written, or read and written.

At a chip tray 12, the RFID tag 2 of the game token coin 1 collected and kept in the chip tray and the game token coin 1 kept on the chip tray is read, written, or read and written to.

The game table may further include a payment area, in which the RFID tag 2 the game token coin 1 placed therein by the dealer for redemption money for the player may be read, written, or read and written.

As described above, at the game table, the variable information 4 (i.e., the location relating information 220) can be updated at timing at which the game token coin 1 is bet (bet timing), timing at which the game token coin 1 is collected by the dealer (collecting timing), and timing at which the dealer pays the game token coin 1 to the player (payment timing). The variable information 4 may be updated at all the bet timing, the collecting timing, and the payment timing, or the variable information 4 may be updated at a part of these timings.

Figure 7A:
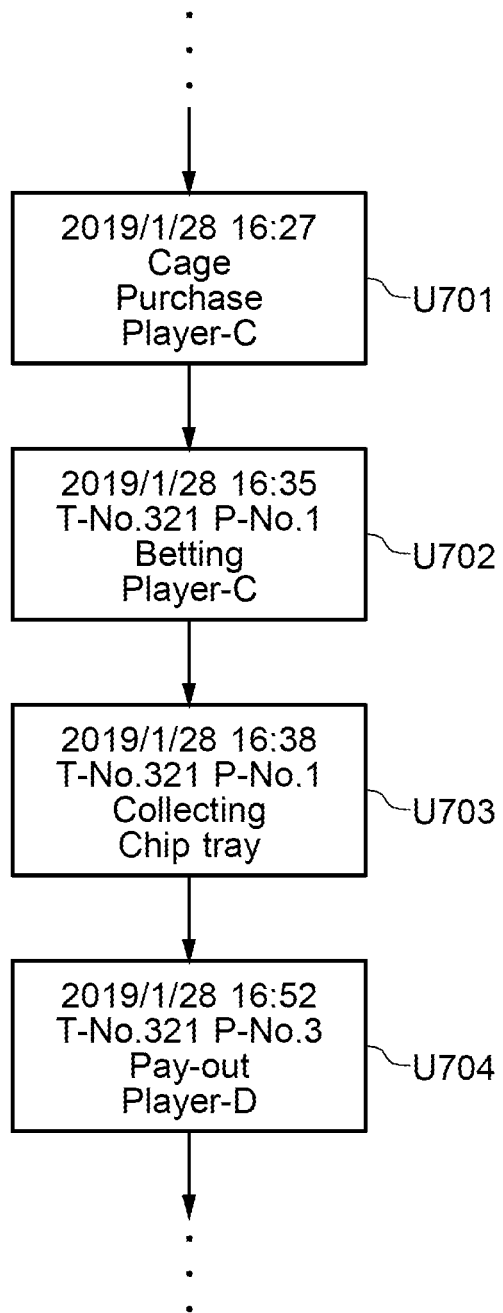
FIG. 7A is a conceptual diagram showing a recording method for data of the game token coin according to an embodiment of the present disclosure (an example in which variable information is updated at all of the bet timing, the collecting timing, and the payment timing).

FIG. 7A shows an example in which the variable information 4 is updated at all the bet timing, the collecting timing, and the payment timing. The variable information 4 is updated at these timings, and the movement of the game token coin 1 can be determined as follows. At 16:27 on Jan. 28, 2019, Player-C exchanges cash for a game token coin 1 at the cage 5 (Update U701). At 16:35 on January 28, Player-C bets the game token coin 1 at player position No. 1 at table No. 321 (Update U702). Player-C loses the game, and at 16:38 on January 28, the game token coin 1 is collected on the chip tray 12 (Update U703). After that, Player-D wins the game at player position No. 3 at table No. 321, and at 16:52 on January 28, the dealer pays the game token coin 1 to Player-D (Update U704).

According to this example, first, since information on the dealer and any player can be written as the owner information 223 in the variable information 4, the history of the owners can be accurately determined. Specifically, according to the present example, the state can be achieved in which the actual owner is matched with information on the owner all the time. Note that in the betting state, the owner information 223 may be information on the player who makes a bet, not changed, or may be information indicating that a bet is made.

Figure 7B:
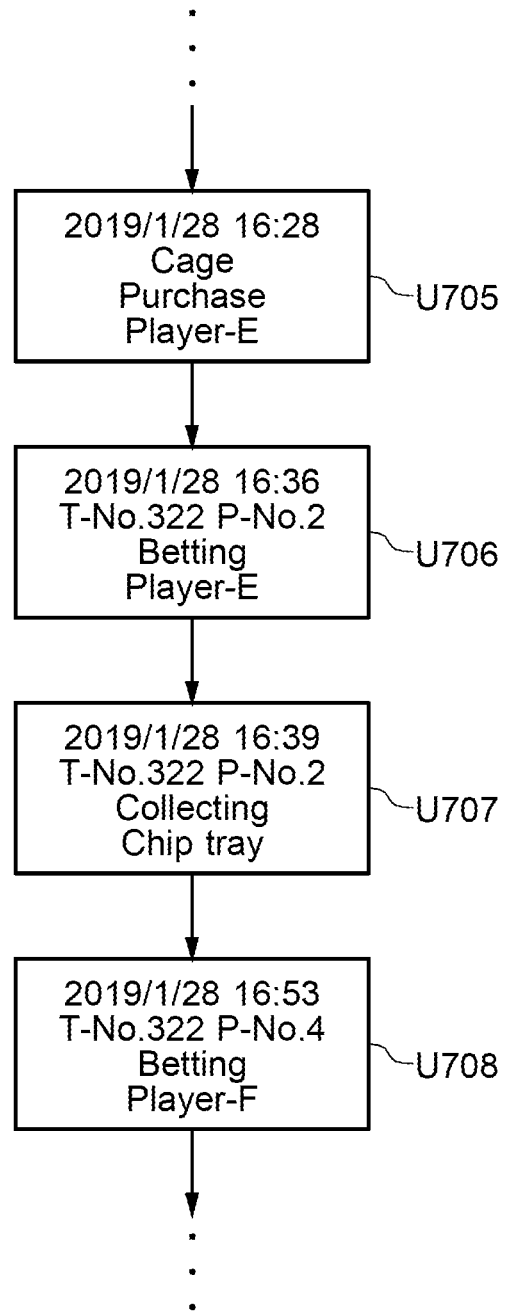
FIG. 7B is a conceptual diagram showing a recording method for data of the game token coin according to an embodiment of the present disclosure (an example in which variable information is updated at bet timing and collecting timing).

FIG. 7B shows an example in which the variable information 4 is updated at the bet timing and the collecting timing. The variable information 4 is updated at these timings, and the movement of the game token coin 1 can be determined as follows. At 16:28 on Jan. 28, 2019, Player-E exchanges cash for a game token coin 1 at the cage 5 (Update U705). At 16:36 on January 28, Player-E bets the game token coin 1 at player position No. 2 at table No. 322 (Update U706). Player-E loses the game, and at 16:39 on January 28, the game token coin 1 is collected on the chip tray 12 (Update U707). The game token coin 1 is paid from the chip tray 12 to Player-F who wins the game, and at 16:53 on January 28, Player-F bets the game token coin 1 at player position No. 4 at table No. 322 (Update U708).

According to this example, it can be determined which player the game token coin 1 on the chip tray 12 (i.e., owned by the casino) is collected from. In addition, it can be determined that the casino surely collects the game token coin 1 from the player.

Figure 7C:
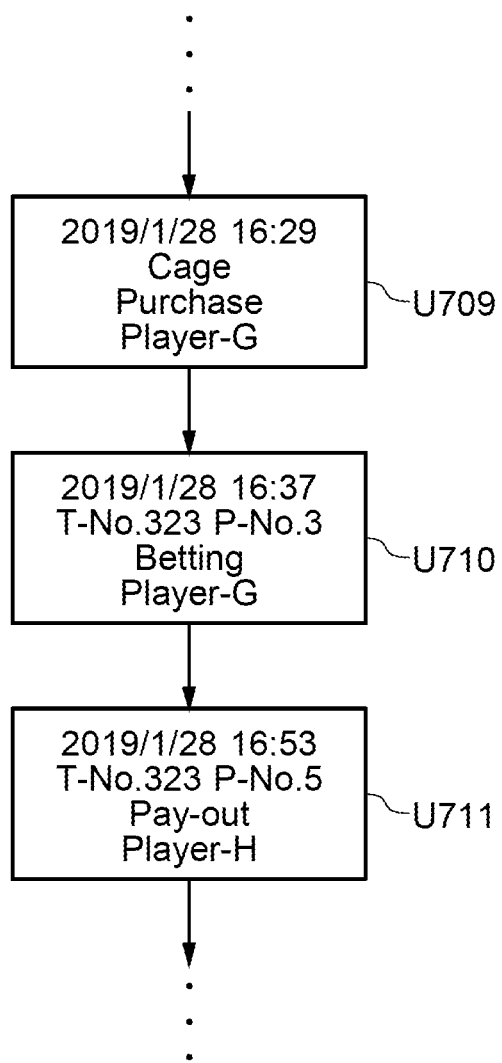
FIG. 7C is a conceptual diagram showing a recording method for data of the game token coin according to an embodiment of the present disclosure (an example in which variable information is updated at bet timing and payment timing).

FIG. 7C shows an example in which the variable information 4 is updated at the bet timing and the payment timing. The variable information 4 is updated at these timings, and the movement of the game token coin 1 can be determined as follows. At 16:29 on Jan. 28, 2019, Player-G exchanges cash for a game token coin 1 at the cage 5 (Update U709). At 16:37 on January 28, Player-G bets the game token coin 1 at player position No. 3 at table No. 323 (Update U710). After Player-G loses the game and the game token coin 1 is collected on the chip tray 12, at 16:53 on January 28, the dealer pays the game token coin 1 to Player-H who wins the game at player position No. 5 at table No. 323 (Update U711).

According to this example, the betting by the players and the payment (redemption) to the players can be determined. For example, in the case in which after the betting by Player-G, Player-H makes a bet without payment to Player-H, it can be determined that the game token coin is directly delivered from Player-G to Player-H.

Figure 7D:
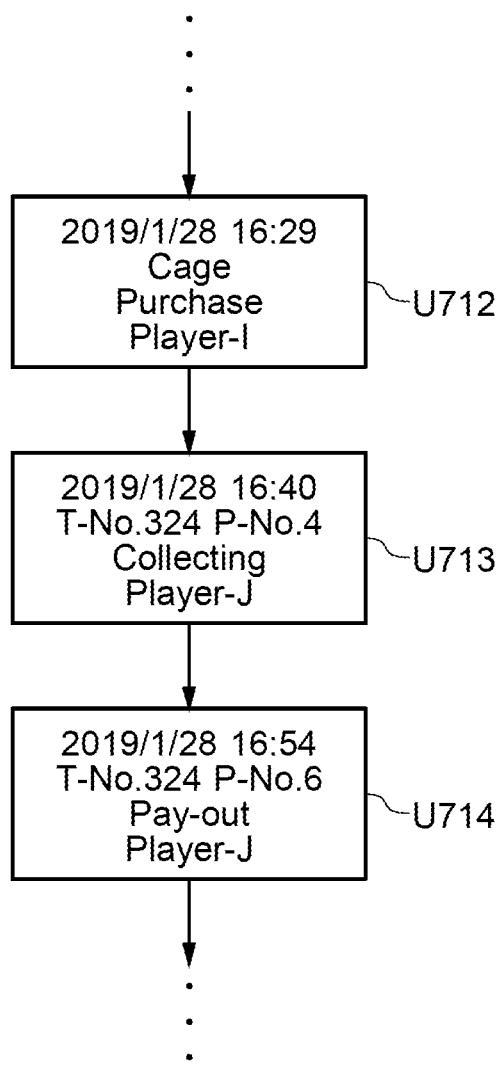
FIG. 7D is a conceptual diagram showing a recording method for data of the game token coin according to an embodiment of the present disclosure (an example in which variable information is updated at collecting timing and payment timing).

FIG. 7D shows an example in which the variable information 4 is updated at the collecting timing and the payment timing. The variable information 4 is updated at these timings, and the movement of the game token coin 1 can be determined as follows. At 16:29 on Jan. 28, 2019, Player-I exchanges cash for a game token coin 1 at the cage 5 (Update U712). As a result that Player-I bets the game token coin 1 at player position No. 4 at table No. 324, Player-I loses the game, and at 16:40 on January 28, the game token coin 1 is collected on the chip tray 12 (Update U713). At 16:54 on January 28, the dealer pays the game token coin 1 to Player-J who wins the game at player position No. 6 at table No. 324 (Update U714).

Also according to this example, since information on the dealer and any player can be written as the owner information 223 in the variable information 4, the history of the owners can be accurately determined. Specifically, according to the present example, the state can be achieved in which the actual owner is matched with information on the owner all the time.

Figure 7E:
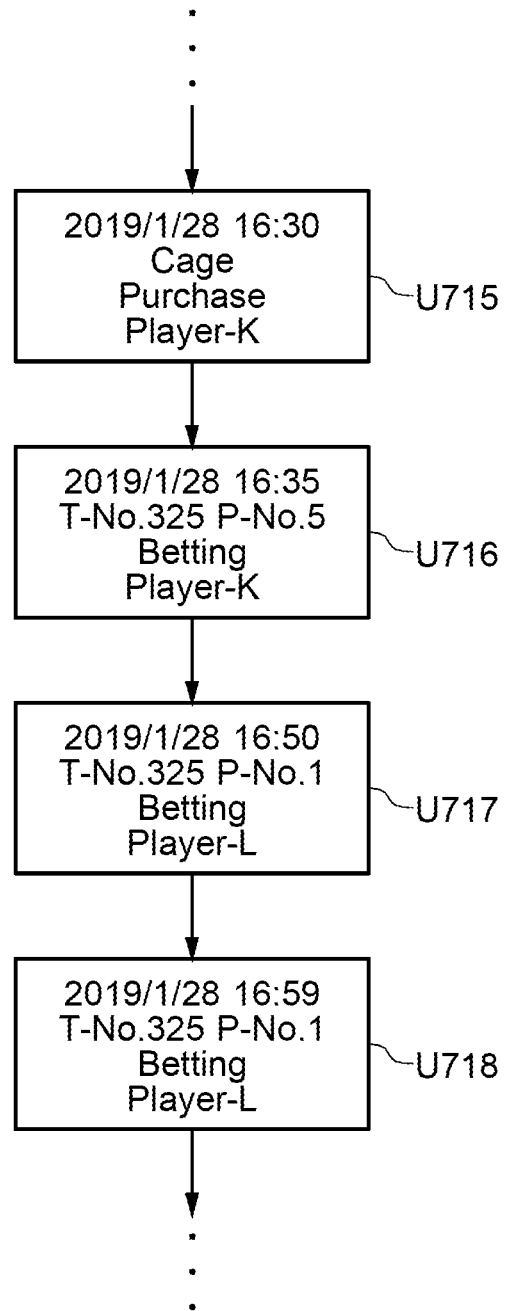
FIG. 7E is a conceptual diagram showing a recording method for data of the game token coin according to an embodiment of the present disclosure (an example in which variable information is updated at bet timing).

FIG. 7E shows an example in which the variable information 4 is updated at the bet timing. The variable information 4 is updated at the bet timing, and the movement of the game token coin 1 can be determined as follows. At 16:30 on Jan. 28, 2019, Player-K exchanges cash for a game token coin 1 at the cage 5 (Update U715). At 16:38 on January 28, Player-K bets the game token coin 1 at player position No. 5 at table No. 325 (Update U716). After Player-K loses the game and the game token coin 1 is collected on the chip tray 12, Player-L at player position No. 1 at table No. 325 wins the game and receives the payment of the game token coin 1. After that, at 16:50 on January 28, Player-L bets the game token coin 1 at player position No. 1 at table No. 325 (Update U717). After Player-L wins the game and collects the game token coin 1 to himself, at 16:59 on January 28, Player-L bets the game token coin 1 at player position No. 1 at table No. 325 (Update U718).

According to this example, how the players who own the game token coin 1 are transitioned via the chip tray 12 can be determined. It can be determined that the game token coin 1 is actually bet. Thus, it can be confirmed that the game token coin 1 is not used for money-laundering.

Figure 7F:
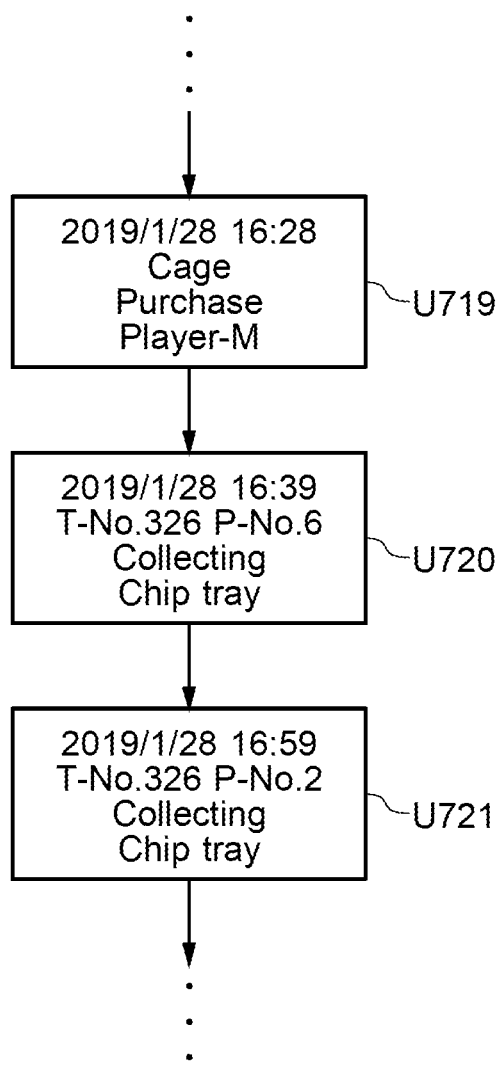
FIG. 7F is a conceptual diagram showing a recording method for data of the game token coin according to an embodiment of the present disclosure (an example in which variable information is updated at collecting timing).

FIG. 7F shows an example in which the variable information 4 is updated at the collecting timing. The variable information 4 is updated at the collecting timing, and the movement of the game token coin 1 can be determined as follows. At 16:28 on Jan. 28, 2019, Player-M exchanges cash for a game token coin 1 at the cage 5 (Update U719). Player-M bets the game token coin 1 at player position No. 6 at table No. 326 and loses the game, and at 16:39 on January 28, the game token coin 1 is collected on the chip tray 12 (Update U720). After that, Player-N wins the game at player position No. 2 at table No. 326, and receives the payment of the game token coin 1. Player-N bets the game token coin 1 on the subsequent game at player position No. 2 at table No. 326, and loses the game. At 16:59 on January 28, the game token coin 1 is collected on the chip tray 12 (Update U721).

According to this example, it can be known which game table the game token coin 1 is used at and when the game token coin 1 is used. In the case in which a fraud is suspected, video on the suspicious game table can be checked on suspicious hours, and it can be confirmed that the game token coin 1 is not used for money-laundering.

Figure 7G:
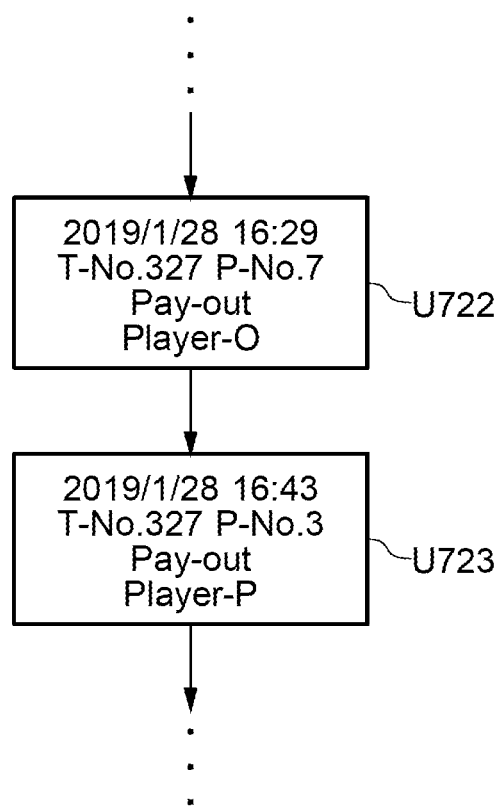
FIG. 7G is a conceptual diagram showing a recording method for data of the game token coin according to an embodiment of the present disclosure (an example in which variable information is updated at payment timing).

FIG. 7G shows an example in which the variable information 4 is updated at the payment timing. The variable information 4 is updated at the payment timing, and the movement of the game token coin 1 can be determined as follows. At 16:29 on Jan. 28, 2019, Player-O receives the payment of a game token coin 1 at a set at player position No. 7 at table No. 327 (Update U722). After that, Player-O bets the game token coin 1 and loses the game at table No. 327, and the game token coin 1 is collected on the chip tray 12. After that, Player-P wins the game at player position No. 3 at table No. 327. At 16:43 on January 28, the dealer pays the game token coin 1 to Player-P (Update U723).

According to this example, it can be determined which game table the game token coin 1 owed by the player is paid at. Thus, it is known that the game token coin 1 is not stolen from the chip tray, and it can be confirmed that the game token coin 1 is not used for money-laundering.

As described above, in the management system according to the present embodiment, at the game table, the variable information 4 (i.e., the location relating information 220) is updated at least any one timing of the bet timing, the collecting timing, and the payment timing.

Note that in the example, the update of the variable information 4 at the collecting timing may be performed in the bet area, or may be performed on the chip tray. In the operation of baccara games, the bet chip of the player who loses the game is first collected, and then payment is made to the player who wins the game. Thus, time for updating the variable information 4 in the bet area can be reserved for relatively long time for the game token coin 1 owed by the player who wins the game, and the variable information 4 can be relatively reliably updated also in the bet area.

On the other hand, in regard to the game token coin 1 that has to be collected, time for which the game token coin 1 is present in the bet area is relatively short from the time at which the collection is determined (the game result is determined) to the time at which the game token coin 1 is actually collected. Thus, when it is desired to update the variable information 4 in the bet area, the update may not be finished. Therefore, in regard to the game token coin 1 to be collected, it is favorable to rewrite the variable information 4 in the chip tray as a collection destination.

The management controller 15 has a function that determines whether the location relating information 220 obtained from the read result by the reader 13 at places has no abnormality. For determination of an abnormality, determination can be made whether there is any event that the game token coin 1 is not used for a predetermined period or more from the previous write or that the location relating information which has to be written is not written.

The event that the game token coin 1 is not used for a predetermined period or more from the previous write is any situation in which: 1) latest location relating information is information indicating the cage 9, and the subsequent information write is made after an elapse of a predetermined time or more, 2) the latest location relating information is information indicating entering at the gate 10, and the subsequent information write is made after an elapse of a predetermined time or more, and 3) the latest location relating information is information indicating leaving the gate 10, and the subsequent information write is made after an elapse of a predetermined time or more.

The event that the location relating information which has to be written is not written is any situation in which: 4) when a player enters the gaming house, as latest location relating information on the data rewritable region 22 of the game token coin 1, information indicating leaving the gate 10 is not written, 5) when the game token coin 1 is used at the cage 9, information indicating the backyard 7 is not written, and 6) when a player leaves the gaming house, information indicating the cage 9 or the backyard 7 is not written.

The management controller 15 can determine any situation as the event that is determined as an abnormality based on the owner relating information 223 obtained from the reader 13 in which: 1) a person different from the final owner stored in the data rewritable region 22 converts the game token coin 1 into money in the gaming house, or makes exchange of game token coins, or leaves the gaming house, and 2) a person different from the owner in leaving stored in the data rewritable region 22 brings in the game token coin in the gaming house.

The management controller 15 determines any of situations 1) to 4) as the event that is determined as an abnormality based on information obtained from the reader 13 indicating information indicating the place of the bet area 11 or information indicating the place of the chip tray 12 or the payment area, in which: 1) a person different from the final owner stored in the data rewritable region 22 uses the game token coin 1 at the game table, 2) a person different from a person who purchases a game token coin 1 at the cage 9 converts the game token coin 1 having no use record at the game table into money at the cage 9, 3) a game token coin 1 that does not have information indicating the cage 9 or the backyard 7 is used in the gaming house, and 4) the latest location relating information is information indicating the bet area 11 or the payment area, and the game token coin 1 is converted into money at the cage 9 or used at the game table after a lapse of a predetermined period or more.

FIG. 6 shows a database according to another embodiment of the present disclosure. In addition to an RFID tag of a game token coin 1 which stores the constant information 3 and the variable information 4, the management system includes a database 17 that records a similar constant information 3 and variable information 4. A management controller 15 can record information on the database 17 based on a read result by a reader 13, can check the constant information 3 and the variable information 4 stored the RFID tag the game token coin 1 against information of the database, and can determine an abnormality.

In the RFID tag 2 according to the embodiment of the present disclosure, the region in which data is functionally non-rewritable in the data non-rewritable region 21 may be a TID. The region in which necessary information is written in the data non-rewritable region 21 and then the region is locked so as not to allow data write may be an EPC or a user region. The data rewritable region 22 may be an EPC or a user region.

Figure 4:
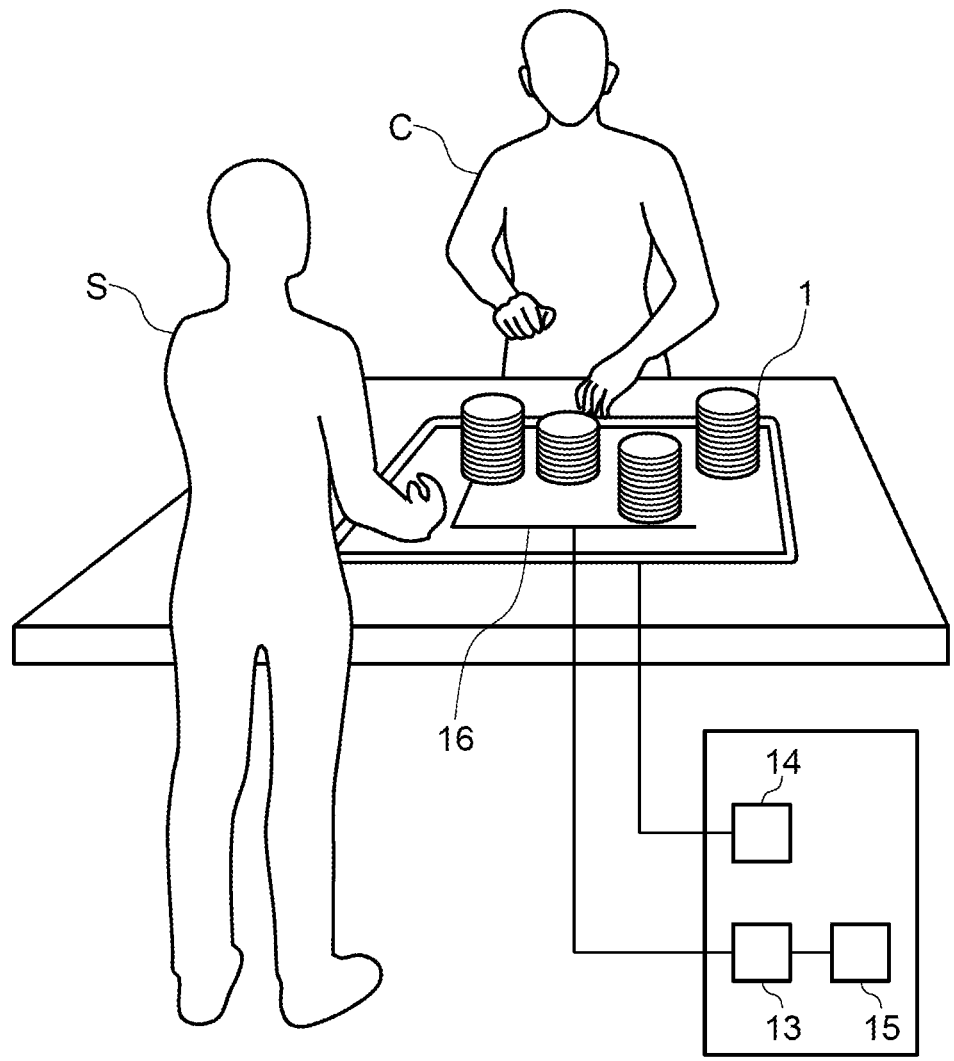
FIG. 4 is a diagram showing a reader and a writer of the game token coin according to an embodiment of the present disclosure.

The forms of the reader 13 and the writer 14 may be changed depending on places. For example, at the factory 6, the forms of the reader 13 and the writer 14 may be in a stage shape shown in FIG. 4, at the gate 10, the forms of the reader 13 and the writer 14 may be in a box shape, and in the bet area 11 or on the chip tray 12, the bet area 11 or the chip tray 12 itself may include functions of the reader 13 and the writer 14. The game token coin 1 may be stacked as they are, or the game token coin 1 may be read and written in the state in which the game token coin 1 is housed in a chip case, for example. The reader 13 and the writer 14 may be integrated with each other.

In the embodiments above, the case is described in which the game token coin has one RFID tag, and the one RFID tag has a data non-writable region and a data rewritable region. To this, a form can also be thought in which two RFID tags are placed in a game token coin, one RFID tag stores constant information and then locked so as not to allow data write and the other RFID tag allows data rewrite in order to record variable information.

Figure 5A:
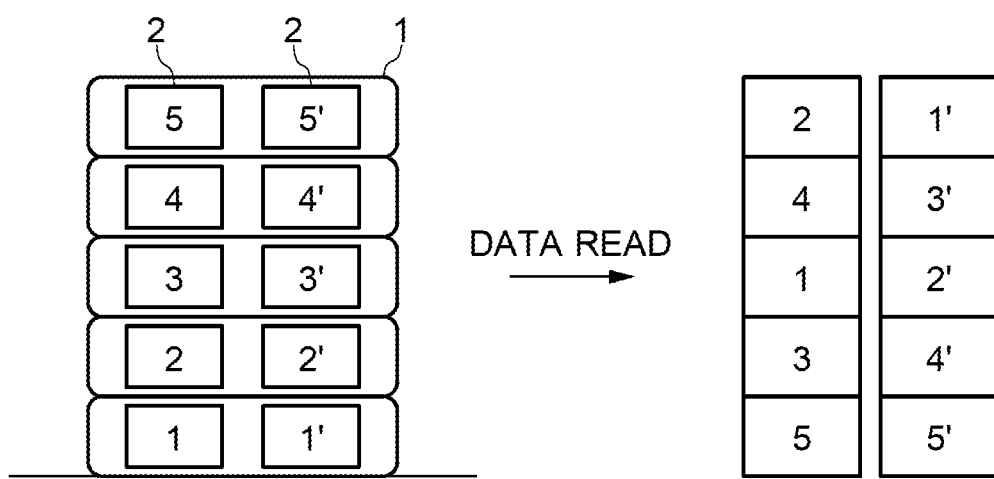
FIG. 5A is an illustrative diagram showing the data structure of the game token coin according to an embodiment of the present disclosure.

However in this case, in the case in which a plurality of game token coins is collectively read, the information group of the constant information 3 and the information group of the variable information 4 are separately read as shown in FIG. 5A. Thus, a problem arises that the determination of a combination of the constant information and variable information of a certain game token coin fails and the identification of a game token coin having an abnormality on variable information fails.

Figure 5B:
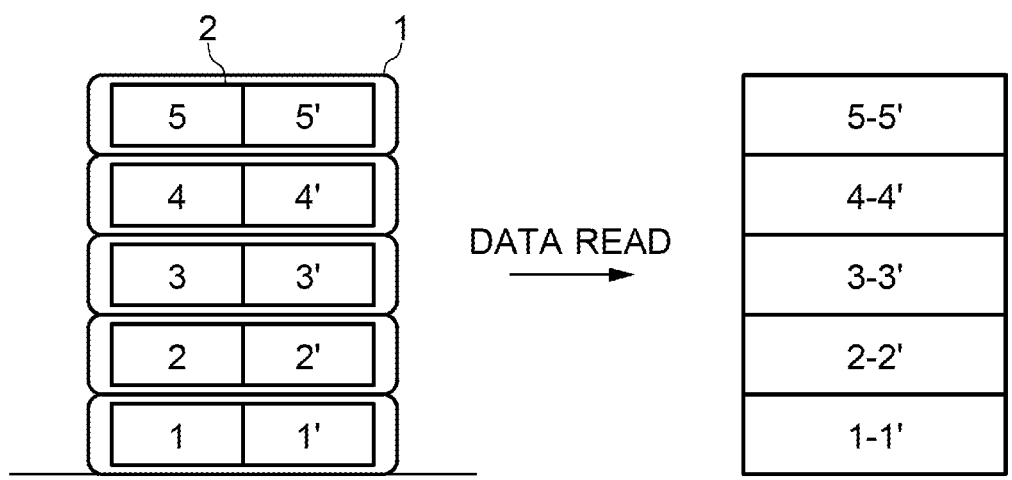
FIG. 5B is an illustrative diagram showing the data structure of a game token coin according to another embodiment of the present disclosure.

To this, as shown in FIG. 5B, in the case in which one RFID tag is available, the corresponding relationship between the constant information and the variable information read by the reader can be determined even in the case in which a plurality of game token coins is collectively read. Thus, it is thought that the game token coin is embodied using one RFID tag, which is more excellent.

Generally, the RFID tag having a larger diameter more improves read accuracy. Thus, in the case in which a game token coin includes an RFID tag, the RFID tag desirably has a size having a diameter that is at least the radius of the game token coin or more. Therefore, two RFID tags are included in a game token coin to reduce the diameter of each RFID tag, which is not preferable. Since the inclusion of two RFID tags increases the number of RFID tags to be read, this leads to a slowed read rate when a plurality of game token coins is read.

From the points above, it is thought that the game token coin is more effectively embodied using one RFID tag.

What is claimed is:

1. A management system for a plurality of game token coins, wherein each respective game token coin of the plurality of game token coins includes a radio frequency identification (RFID) tag that has (a) a non-rewritable data region configured to store, as constant information, at least one of production information, product information, casino information, value information, and a serial number of the respective game token coin, and (b) a rewritable data region configured to store variable information, wherein the variable information comprises information that changes during use of the game token during a game, the system comprising:
 a writer;
 a reader;
 a database external to the plurality of game token coins; and
 a management controller;
 wherein:
  the writer is configured to write the variable information of the respective game token coin to the rewritable data region of the respective game token coin and to the database;
  the rewritable data region is configured to store a plurality of sets of the variable information relating to a plurality of locations, events or statuses;
  the reader is configured to:
   read the constant information stored in the non-rewritable data region of the respective game token coin; and
   read the variable information stored in the rewritable data region that is paired with the constant information; and
  the management controller is configured to, for the respective game token coin:
   determine a presence of an abnormality based on the variable information of the respective game token coin; and
   generate an error signal in response to determining the presence of the abnormality.

2. The management system according to claim 1, wherein the rewritable data region is configured to additionally store information on time at which the writer writes to the respective game token coin.

3. The management system according to claim 1, wherein the management controller is configured to determine the abnormality based on a history of the variable information.

4. The management system according to claim 1, wherein the variable information includes information relating to an owner who owns the respective game token coin.

5. The management system according to claim 4, wherein:
 the management controller is configured to determine, as the abnormality based on the information relating to the owner, an occurrence of a predefined event; and
 the predefined event is any of an event group consisting of one or both of the following:
  (1) a person different from a final owner stored in the rewritable data region (a) converts the respective game token coin into money, (b) conducts an exchange, using the respective game token coin, in a gaming house, and/or (c) leaves the gaming house with the respective game token coin; and
  (2) a person different from an owner indicated in the variable information of the respective game token coin upon an exit from the gaming house brings the respective game token coin into the gaming house.

6. A game token coin that is used in the management system according to claim 1.

7. A reader for a game token coin used in the management system according to claim 1.

8. A game token coin comprising a radio frequency identification (RFID) tag that includes a non-rewritable data region and a rewritable data region, wherein:
 the non-rewritable data region is configured to store, as constant information, at least one of production information, product information, casino information, value information, and a serial number of the game token coin; and
 the rewritable data region is configured to store variable information of the game token coin written by a writer, wherein the variable information is written to a database external to the game token coin in addition to the rewritable data region of the game token coin.

9. The management system according to claim 1, further comprising a database external to the respective game token coin, wherein:
  the writer is configured to write the variable information of the respective game token coin to the database in addition to the rewritable data region of the respective game token coin.

10. The management system according to claim 1, wherein the management controller is configured to, for the respective game token coin:
  compare the variable information of the respective game token coin read by the reader from the rewritable data region of the respective game token coin with the variable information of the respective game token coin stored in the database;
  determine presence of an abnormality based on a comparison result; and
  generate an error signal in response to presence of the determination of the presence of the abnormality.

* * * * *